April 8, 1930.   G. WARWICK   1,753,586
MANUFACTURE OF THE RIMS OF MOTOR VEHICLE STEERING WHEELS
Filed April 2, 1928   3 Sheets-Sheet 2
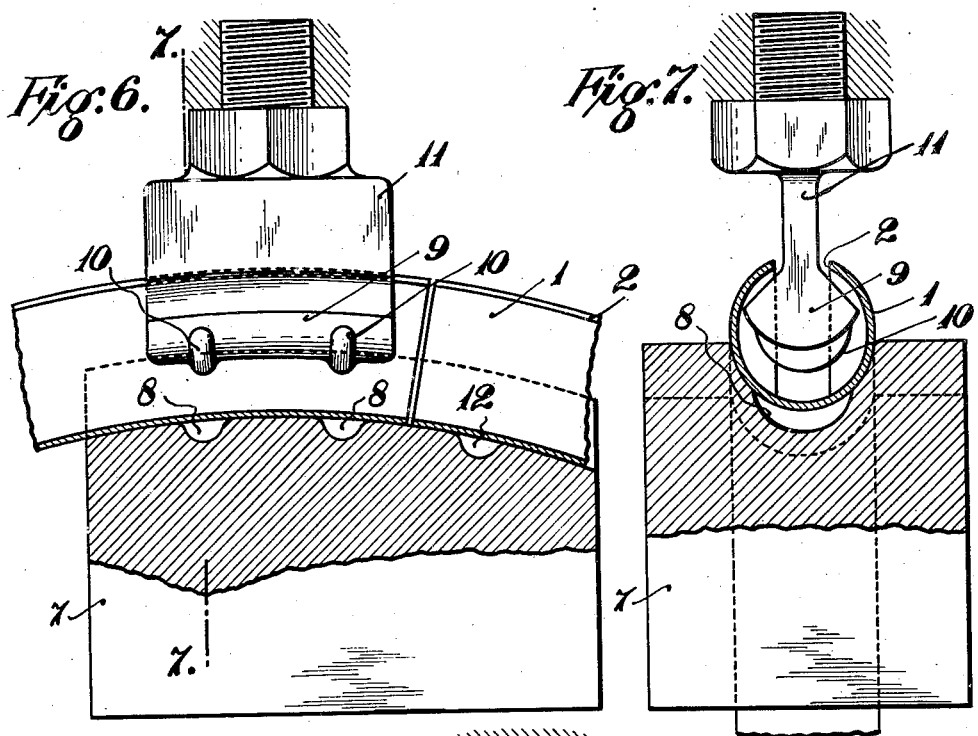
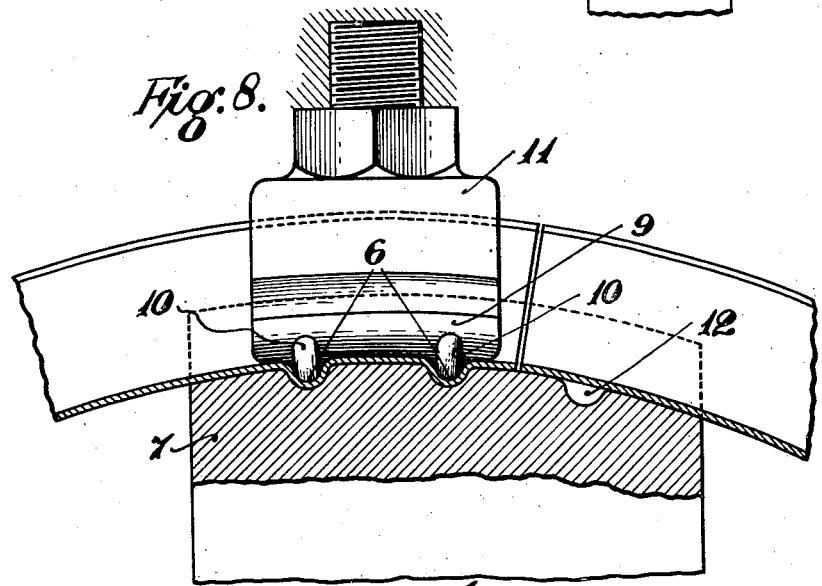

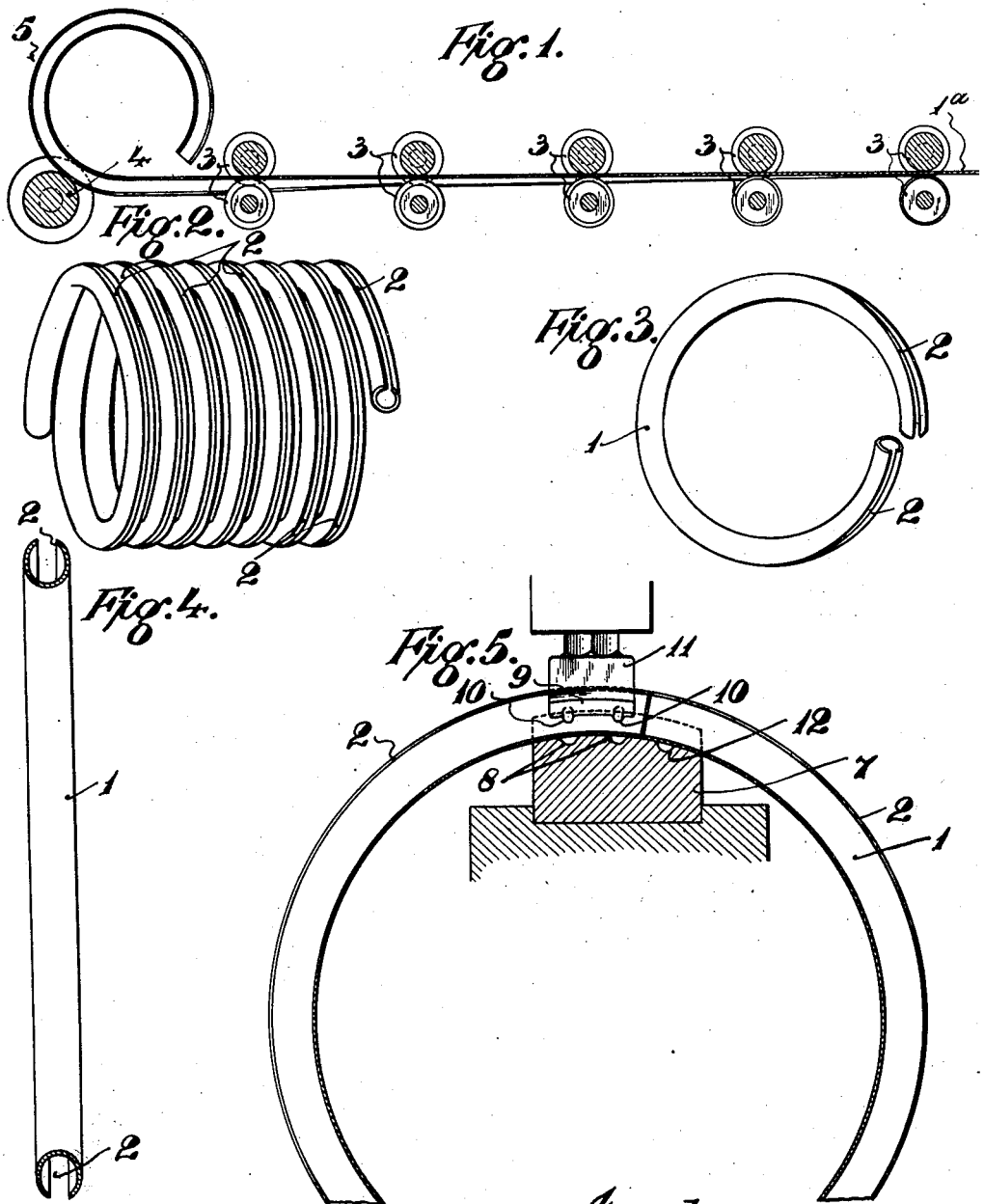

April 8, 1930.  G. WARWICK  1,753,586
MANUFACTURE OF THE RIMS OF MOTOR VEHICLE STEERING WHEELS
Filed April 2, 1928    3 Sheets-Sheet 3
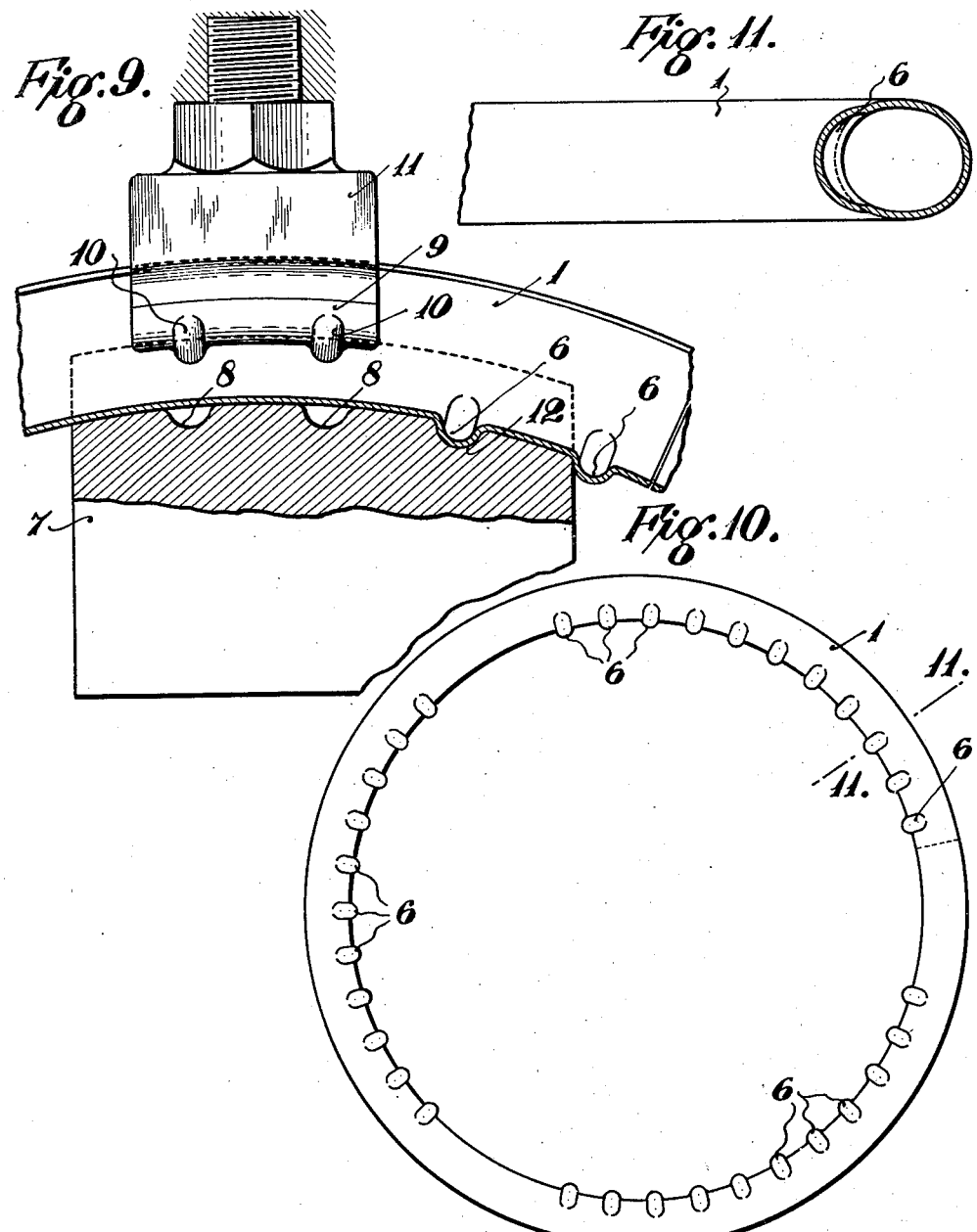

Patented Apr. 8, 1930

1,753,586

UNITED STATES PATENT OFFICE

GEORGE WARWICK, OF BIRMINGHAM, ENGLAND

MANUFACTURE OF THE RIMS OF MOTOR-VEHICLE STEERING WHEELS

Application filed April 2, 1928, Serial No. 266,844, and in Great Britain April 29, 1927.

This invention relates to the tubular rims of motor vehicle steering wheels, and has for its object to provide an improved and more efficient method of making such rims, the invention relating more particularly to steering rims of that type in which a series of projections or protuberances are formed or provided around the periphery for the purpose of enabling the driver of the vehicle to obtain a better grip on the wheel.

The present invention consists in forming the rim of the steering wheel from a single metal strip which is fashioned into annular form, the longitudinal edges of the strip being arranged adjacent one another and extending along the outer periphery of the rim. The strip is preferably passed between rollers adapted to fashion it into a channel formation, further rollers being provided which successively deepen the channel until the strip assumes a tubular form, with its longitudinal edges separated by a narrow gap or slot. The tube, thus formed, is then arranged to engage against another roller or other part which fashions it into a spiral having a number of coils, each of which is cut off and shaped to form one complete tubular ring or rim. The gap or slot formed by the separated edges of the strip is arranged as stated to extend around the outer periphery of the rim, and this gap is subsequently closed to form a tight joint. Where, however, it is desired to form projections or protuberances around the rim to provide a better grip for the driver, the said projections are formed before the closing of the gap or slot by means of a suitable tool which is arranged to extend through the latter. The projections or protuberances are preferably formed in a press, the press tool being shaped to form two or any suitable number of stamped-up projections at one operation, the rim being moved around the die of the press after each set of projections have been stamped until the series is completed. The tool may be introduced through one of the ends of the rim, the said ends being subsequently welded or otherwise secured together. By arranging the joint to extend around the outer periphery of the rim the inner periphery of the latter, to which the spokes are attached, is not weakened in any way..

Figure 1 of the accompanying drawings shows the rollers through which the flat metal strip for forming the rim of the steering wheel is passed in order to fashion it into the desired tubular formation, showing also the end roller for causing the rolled strip to assume a spiral form.

Figure 2 is a view of the completed spiral after the rolled strip has been removed.

Figure 3 represents a perspective view of one of the coils of the spiral cut off for forming into one complete rim.

Figure 4 represents a cross-section through the coil, or partly completed rim upon a larger scale.

Figure 5 shows the rim placed in the press for forming the stamped-up projections for protuberances around its inner periphery.

Figure 6 is a view upon a larger scale of the press tool and lower die, with the rim (in section) in position and the tool raised.

Figure 7 is a cross-section through the rim and lower die, on the line $x$—$x$, Figure 6 with the press tool in side elevation, illustrating the manner in which the tool extends through the peripheral slot in the rim.

Figure 8 shows the press tool moved down to form the projections on the rim.

Figure 9 shows the press tool raised, and the rim moved round into position for forming the next pair of projections.

Figure 10 is a view of the completed rim.

Figure 11 represents a cross-section on the line 11—11, Figure 10.

Referring to the drawings, the rim 1 of the steering wheel is formed, according to this invention, from a single metal strip 1ª, preferably of steel, which is fashioned into a tubular-sectioned ring by passing it between rollers. A number of similarly shaped rings are preferably formed, in the manner illustrated in Figures 1 and 2, from the same metal strip, the latter being fashioned to the desired section by passing it between a series of rollers 3, each pair of rollers being constructed so as successively to deepen the channel in the strip until the latter is fashioned into the desired cross-sectional shape, the end of the shaped strip being arranged to engage an additional roller 4 disposed so as to direct the end of the strip upwards in such a manner that the shaped strip is fashioned into a spiral 5 (Figure 2) having a number of coils each of which may be cut off and shaped to form one complete ring constituting the partly formed rim of the steering wheel. When the rim 1 has been partly formed in this manner the separated longitudinal edges of the rolled strip leave a narrow slot 2 around its outer periphery, whilst the ends of the strip are slightly separated, so that the rim is thus transversely divided. Before the peripheral slot 2 is closed a number of stamped-up projections 6 are formed around the inner periphery of the rim by means of a suitable tool arranged to extend through the slot 2. This stamping operation is effected in a press, the partly formed rim 1 being arranged above the bed of the press, so that its inner periphery rests upon the lower die 7, the latter being suitably curved and formed with separated recesses 8 corresponding to the desired shape of the projections to be formed around the rim. The top tool 9 of the press is formed with a pair of co-operating projections 10, and in order that it may be inserted within the partly formed rim so that it extends through the slot 2 it is specially shaped and formed with a flattened upper portion 11 of a width slightly less than that of the slot 2, the said tool having a relatively enlarged lower end (see Figure 7) shaped to conform to the curvature of the inner wall of the rim. The said enlarged lower end of the tool carries the projections 10 and is introduced into the rim through the one end of the latter. Owing to the tool extending through the slot 2, the rim 1 may be moved round relatively to the said tool, and after the press has been operated to form one pair of projections 6 at the inner periphery of the rim, the said rim is moved into another position to enable an adjacent pair of projections to be formed, the operation being repeated until the desired number of projections have been stamped up from the rim. In order to position the rim after each pair of projections have been stamped up an additional recess 12 is formed in the bottom die 7, so that the latter is thus provided with three recesses, whilst only two projections are provided upon the press tool. This additional recess 12 serves as a locating means for correctly positioning the rim. Thus, after the one pair of projections 6 have been stamped up from the rim the latter is moved round until one of the projections fits into the third recess 12 in the die as shown in Figure 9, so that the unstamped portion of the rim lies above the other two recesses 8 in the die. In this manner it is possible to form a series of projections around the rim spaced at equal distances apart.

After the projections 6 have been formed around the inner periphery of the rim 1 in the above manner, the said rim is removed from the press and its ends are welded together. The slot 2 around its outer periphery is then closed by spinning over, and rolling or pressing together, the opposed edges of the said slot, so that they abut tightly against one another and form a perfectly close joint. The said rim is thus completed, being in the form of a closed tubular ring having integral stamped-up projections 6 around its inner periphery, as shown in Figure 10, the whole being formed, as stated, from a single metal strip, thus not only enabling the rim to be cheaply manufactured, but also permitting of a rim of considerable strength and rigidity to be produced. After the metal rim of the steering wheel has been completed it may be provided with a celluloid or any other suitable covering, whilst the spokes of the wheel may obviously be attached in any suitable manner. The rim, moreover, is considerably strengthened owing to the joint extending around its outer periphery instead of around its inner periphery. Owing to the spokes of the wheel being attached to the inner periphery it is important that this should not be weakened in any way.

Any suitable number of projections may be stamped up from the rim at each operation of the press, whilst the projections may be in the form of ribs, or they may be of any other suitable shape.

Having fully described my invention, what I desire to claim and secure by Letters Patent is:—

1. The method of forming a tubular steering wheel rim from a single metal strip consisting in fashioning the latter by rollers into a part-tubular formation having separated longitudinal edges, fashioning the shaped strip into a circular rim form, so that the separated longitudinal edges of the strip extend around the outer periphery, stamping up projections around the inner periphery of the rim by a tool passing between the separated peripheral edges of the rim, and subsequently closing the said edges together.

2. The method of forming a tubular steering wheel rim from a single metal strip, consisting in fashioning the latter by rollers into a part-tubular formation having separated longitudinal edges, fashioning the shaped strip into a circular rim form so that the separated longitudinal edges of the strip extend around the outer periphery, placing the rim upon a recessed die and stamping up projections around its inner periphery by a tool extending through the peripheral slot in the rim, closing the peripheral edges of the rim together and securing together the ends of the rim.

3. The method of forming a tubular steering wheel rim from a single metal strip consisting in fashioning the latter into a part-tubular formation having separated longitudinal edges, fashioning the shaped strip into a circular rim form so that the separated longitudinal edges of the strip extend around the outer periphery, placing the rim on a recessed die and stamping up projections around its inner periphery by a tool extending through the peripheral slot in the rim, the die having a locating recess for spacing the projections at correct distances apart, closing the peripheral edges of the rim together and securing together the ends of the rim.

4. The method of forming a number of steering wheel rims from a single metal strip, consisting in fashioning the latter by rollers into a part-tubular form, fashioning the shaped strip into a spiral form with a slot extending around its outer periphery, cutting off the coils of the spiral, stamping up projections around the inner periphery of each coil by a tool extending through the slot, closing together the edges of the slot, and securing together the ends of the coil.

In testimony whereof I have affixed my signature.

GEORGE WARWICK.